United States Patent [19]
Seo et al.

[11] Patent Number: 5,644,015
[45] Date of Patent: Jul. 1, 1997

[54] PROCESS OF MANUFACTURING IMPROVED POLYURETHANE FIBER POLYMER

[75] Inventors: Seung-Won Seo, Kunpo-si; Mun-Seon Kim, Seoul, both of Rep. of Korea

[73] Assignee: Hyosung T & C Co., Ltd., Seoul, Rep. of Korea

[21] Appl. No.: 686,056

[22] Filed: Jul. 24, 1996

[51] Int. Cl.$^6$ .......................... C08G 18/18; C08G 18/32
[52] U.S. Cl. ................... 528/60; 528/61; 528/906
[58] Field of Search ................... 528/60, 61, 906

[56] References Cited

U.S. PATENT DOCUMENTS

| | | |
|---|---|---|
| 3,111,368 | 11/1963 | Romano . |
| 4,973,647 | 11/1990 | Bretches et al. ............ 528/61 |
| 5,000,899 | 3/1991 | Dreibelbis et al. .......... 264/204 |
| 5,362,432 | 11/1994 | Houser et al. .............. 264/205 |
| 5,516,872 | 5/1996 | Mafoti et al. ............... 528/60 |
| 5,545,707 | 8/1996 | Heidingfeld et al. ........ 528/60 |

OTHER PUBLICATIONS

Translation of Japanese Kokai No. 58–194915, Published Nov. 14 1983 (Katsuo).
Translation of Japanese Kokai No. Heisei 3–279 415, Published Dec. 10 1991 (Tamura et al).

*Primary Examiner*—Morton Foelak
*Attorney, Agent, or Firm*—Maria Parrish Tungol; John A. Parrish

[57] ABSTRACT

The present invention relates to a process of producing a polymer suitable for manufacturing spandex filament having remarkable elastic recovery rate and heat-setting efficiency wherein the process comprises: stirring a mixture of a glycol and a diisocyante, where the molar ratio of diisocyanate to glycol is 1.5 to 1.64, in a homogenizer at about 40° to about 50° C. and reacting said mixture to give a first polymer containing less than 4 mole % of unreacted diisocyanate; then, reacting said polymer with a chain-extender mixture containing ethylenediamine, 1,2-diaminopropane, and diethylenetriamine, preferably, about 74 to about 80 mole % of ethylenediamine, about 19 to about 25 mole % of 1,2-diaminopropane and about 0.2 to about 0.8 mole % of diethylenetriamine. Elastic polyurethaneurea-based spandex filament is produced by dry-spinning the polymer.

7 Claims, No Drawings

PROCESS OF MANUFACTURING IMPROVED POLYURETHANE FIBER POLYMER

FIELD OF THE INVENTION

The present invention relates to a process of manufacturing polymer for polyurethaneurea-based elastic filament. More particularly, the present invention concerns a process of manufacturing polymer for spandex filament with a remarkable elongation recovery rate and heat-setting efficiency. The spandex of the present invention is especially suited for use in women's underwear fabrics, swimming and aerobic suits.

DESCRIPTION OF THE PRIOR ART

U.S. Pat. No. 5,000,899 (Spandex Fiber with Copolymer Soft Segment) discloses a polymer formed by reacting p,p'-methylene diphenyl diisocyanate with hydroxyl-terminated copolymer of tetrahydrofuran and 3-methyltetrahydrofuran, while using a mixture of ethylenediamine and 2-methylpentamethylene diamine as a chain extender. Generally, the amount of 2-methylpentamethylene diamine in the diamine mixture is in the range of 20 to 50 mole %.

U.S. Pat. No. 4,973,647 (Fiber from Polyether-Based Spandex) is characterized by using a mixture of ethylene diamine and 2-methyl-1,5-pentanediamine as a chain extender. Generally, the amount of 2-methyl-1,5-pentanediamine in the diamine mixture is in the range of 28 to 32 mole %.

U.S. Pat. No. 5,362,432 (Process for Dry Spinning Spandex) is also characterized by using a mixture of ethylenediamine and 1,2-diaminopropane as a chain extender. Generally, the amount of 1,2-diaminopropane in the diamine mixture is limited in the range of 8 to 17 mole %.

The fibers of U.S. Pat. Nos. 5,000,899, 4,973,647 and 5,362,432 prove to be excellent in terms of heat-setting efficiency but they have some shortcomings in that the high heat used in the heat-setting treatment is responsible for reducing some properties (e.g., elongation and elastic recovery rate) of the spandex fabrics themselves, thus shortening their wear life. Since 2-methyl-1,5-pentanediamine (as described in U.S. Pat. No. 5,000,899 or 4,973,647) and 1,2-diaminopropane (as described in U.S. Pat. No. 5,362,432 as a chain extender in the synthesis of linear-chain polyurethane polymer) has bulky parts, the structure within polyurethane polymer is weakened. Then easily-occurring thermal stress may enhance the heat-setting efficiency during heat-setting treatment. However, the abnormal structure within the polymer leads to reduction of elastic recovery rate.

The use of triamines is disclosed in Japanese Patent Application Publication No. 4-100919 (Process for Manufacturing Polyurethane-based Elastic Filament Insoluble in the Organic Solvent). The examples therein describe a process for manufacturing polyurethane-based elastic filament insoluble in the organic solvent, wherein polymerization intended for manufacturing a polymer insoluble in the organic solvent is performed using ethylenediamine only as a chain extender. Then, triamine, tetramine and pentamine are used prior to the spinning process, followed by spinning and thermal treatment. Generally, the amount of triamine in the polymer is in the range of 0.18 wt % based on the polymer.

The objective of using triamines in the aforementioned Patent Application is to manufacture spandex fiber insoluble in the organic solvent. The elastic filament based on said method is unsuited for the use in fabrics requiring the heat-setting treatment, since its heat-setting efficiency is low.

To overcome the disadvantages of these known methods, the objective of the present invention is to provide a process of producing polymers and filaments suitable for manufacturing spandex fabrics, wherein the filaments have excellent heat-setting efficiency and improved physical properties that are maintained even after the heat-setting treatment.

SUMMARY OF THE INVENTION

The present invention relates to a process of producing a polymer suitable for manufacturing spandex filament having remarkable elastic recovery rate and heat-setting efficiency wherein the process comprises: stirring a mixture of a glycol and a diisocyante, where the molar ratio of diisocyanate to glycol is 1.5 to 1.64, in a homogenizer and reacting said mixture to give a first polymer containing less than 4 mole % of unreacted diisocyanate; then, reacting said polymer with a chain-extender mixture containing ethylenediamine, 1,2-diaminopropane, and diethylenetriamine. The polymer can be dry spun to produce elastic polyurethaneurea-based spandex filament.

According to the present invention, 1,2-diaminopropane is employed as a chain extender, which is the same use as described in U.S. Pat. No. 5,362,432. However, the amount of diaminopropane in the present invention is about 19 to about 25 mole %, which is higher than the amount required by said U.S. Pat. No. 5,362,432 (8 to 17 mole %), thereby enhancing the heat-setting efficiency over that obtained by conventional methods. At the same time, the elastic recovery rate in the initial stage and after heat-setting treatment is improved since the use of diethylenetriamine that forms the tertiary structure in a linear-chain polymer may prevent the weakening of the structure within polyurethane polymer associated with the use of 1,2-diaminopropane. Such weakening is known as one of the shortcomings of conventional methods.

The objective of using diethylenetriamine, which is a kind of triamine, in the present invention is to prevent the weakness of the inter-structure of the polymer that is caused by the use of 1,2-diaminopropane. The appropriate amount of diethylenetriamine based on the polymer is about 0.01 to about 0.06 wt %.

DETAILED DESCRIPTION OF PREFERRED EMBODIMENTS

The process for manufacturing a polymer according to the present invention comprises the following sequential steps:

In the first process step, diisocyanate is reacted with a glycol to give a capped glycol while forming urethane group. Generally, as active ingredients, polytetramethylene ether glycol (number average molecular weight: 1700–2000), which is a polyhydroxy polymer, is used and p,p'-methylene diphenyl diisocyanate is used as an organic diisocyanate. The appropriate molar ratio of diisocyanate to glycol is 1.5 to 1.64.

The presence of unreacted diisocyanate in the aforementioned process reduces the physical properties of the spandex filament. Therefore, in order to reduce the contents of unreacted diisocyanate, prior to initiating the reaction between diisocyanate and glycol, the mixture is adequately stirred by a homogenizer at 40° to 50° C. With such stirring, the contents of unreacted diisocyanate may be reduced. If a homogenizer is not employed, the amount of unreacted diisocyanate is about 17 mole % compared to the case of using the homogenizer wherein the amount of unreacted diisocyanate in the reaction mixture is less than 4 mole %. The contents of unreacted diisocyanate may be measured by a fraction liquid chromatography.

In the second process step, a polymer with the urea structure is formed by using a capped glycol, chain extender and monoamines as a chain terminator. A mixture of ethylenediamine, 1,2-diaminopropane and diethylenetriamine is used as a chain extender in the present invention. Said mixture comprises about 74 to about 80 mole % of ethylenediamine, about 19 to about 25 mole % of 1,2-diaminopropane and about 0.2 to about 0.8 mole % of diethylenetriamine. Diethylamine is employed as a chain terminator and the amount of diethylamine is determined on the molecular weight of the second polymer. N,N'-dimethylacetamide is used as a solvent in this process.

A mixture of chain extenders is reacted with the first polymer to give the polymer solution at a concentration of about 32 to about 35% by weight based on the polymer, and the polymer produced by the second step has an intrinsic viscosity of 1.05 at a concentration of 0.5 grams of polymer/ 100 ml of N,N'-dimethylacetamide as solvent.

In the next process step, conventional ingredients are added to the polymer so as to strengthen discoloration-resistance and improve dyeing property and the solution is then dry spun to form a fiber texture. During the dry-spinning process, the solvent was evaporated by using a gas at high-temperature (220° to 280° C.) thus adjusting the amount of residual solvent present in the spandex filament within 0.5%. The above process gives thermal treatment effects to the polymer thus increasing the degree of polymerization. Before dry-spinning the solution into filaments, the polymer has an intrinsic viscosity of about 1.05 and after dry-spinning, the intrinsic viscosity is about 1.25. It is appropriate to maintain the winding speed by 450 to 650 meters per minute.

The spandex filament, so formed, is knitted with nontextures such as nylon and polyester and then, to remove the wrinkles of the texture, the heat-setting treatment should be performed after dyeing. During the process, the intrinsic viscosity of a polymer is increased by 1.45 and the mechanical properties are enhanced.

The elastic filament manufactured from the spinning process of a polymer produced according to the present invention has a remarkable heat-setting efficiency and its elastic recovery rate is not reduced even after the heat-setting treatment. The elastic recovery rate of elastic filament before the heat-setting treatment is in the range of 19.5 to 24%. After the heat-setting treatment, its elastic recovery rate is in the range of 13 to 18%.

Embodiments of the present invention are further described in the following non-limiting examples.

Strength and elastic properties of the spandex filaments in the following examples are measured in accordance with the general method of ASTI D 2731-72. With three filaments, the samples of a 2-inch gauge length and a zero-to-300% elongation cycle are made, and with the samples, the extension is cycled five times in the range of 0–300% at a constant elongation rate of 800% per minute and then held at the 300% extension for half a minute in the fifth extension.

To determine "elastic recovery rate (%)", the relaxed length of the sample (hereinafter called as "final length") is measured after the fifth extension and the difference between the initial and the final lengths of the sample is expressed by percent. To determine "heat-setting efficiency (%)", the sample is stretched to three times its original length for 2 minutes and then is relaxed. After heat-setting treatment in a steam of 170° to 180° C. for 30 seconds, the difference between the initial and the final lengths of the sample is expressed by percent. The same procedure as described for elastic recovery rate is used to determine the elastic recovery rate (%) after heat-setting treatment and it is expressed by "elastic recovery rate after heat-setting treatment".

EXAMPLE 1

Five hundred eighteen grams (518 g) of p,p'-methylenediphenyldiisocyanate as an organic diisocyanate was mixed with 2300 g of polytetramethylene ether glycol (number average molecular weight: 1800) as polyhydroxy polymer in a molar ratio of 1.62 (NCO/OH =1.52) and stirred in a homogenizer at 45° C. The mixture was then reacted in a pipe reactor for 90 minutes at 95° C. to yield the first polymer having an unreacted diisocyanate content below 4 mole %. The synthetic material was cooled to 40° C., kept at 40° C. for about 12 hours and mixed with N,N'-dimethylacetamide to form a solution containing about 40% solids.

After completely dissolving the first polymer in 4227 g of N,N'-dimethylacetamide as solvent, the second procedure was conducted: a mixture of chain extender solution 76.1 g of ethylenediamine/23.1 g of 1,2-diaminopropane/0.5 g of diethylenetriamine=molar ratio: 80/19.7/0.3) and 1213 g of chain terminator solution (11.6 g of diethylamine in N,N'-dimethylacetamide) was added to the resulting solution which was cooled at 5° C. and stirred vigorously. The resulting polyurethaneurea solution, containing about 35% solids, had a viscosity of about 2500 poise at 40° C. and the polymer had an intrinsic viscosity of 1.05 measured in N,N'-dimethylacetamide at a concentration of 0.5 grams of polymer/100 ml of solution. Before dry-spinning, the following conventional ingredients were added to the solution to strengthen the discoloration-resistance and improve dyeing properties: (a) titanium dioxide amounting to 4.5 wt % in proportion to the polymer produced by the second procedure; (b) a copolymer of p-cresol and divinyl benzene amounting to 1.2 wt %; (c) a polymer of bis(4-isocyanato cyclohexyl) methane and t-butyl diethanol amine amounting to 3.5 wt %; (d) "CYANOX 1790" (a product of Cyanamid, U.S.A.), antioxidant, amounting to 3.5 wt %.

The solution was then dry spun at 250° C. to form elastic filament. The results of various physical properties assessed in this test are summarized in the following Table 1. The polymer had an intrinsic viscosity of 1.25 measured in N,N'-dimethylacetamide at a concentration of 0.5 grams of polymer/100ml of solvent.

EXAMPLE 2

The same procedure as described in EXAMPLE 1 was conducted and its results are illustrated in Table 1, except that ethylenediamine, 1,2-diaminopropane and diethylenetriamine were mixed in a molar ratio of 78:21.5:0.5 before use as a chain extender.

COMPARATIVE EXAMPLE 1

The same procedure as described in EXAMPLE 1 was conducted for manufacturing a polymer and its results are illustrated in Table 1, except that a homogenizer was not used in the first process step, and a mixture of ethylenediamine/1,2-diaminopropane (10 mol% to ethylenediamine) was used as a chain extender as described in U.S. Pat. No. 5,362,432.

COMPARATIVE EXAMPLE 2

The same procedure as described in EXAMPLE 1 was conducted for manufacturing a polymer and its results are illustrated in Table 1, except that a homogenizer was not used in the first process step and a mixture of ethylenediamine/2-methyl-1,5-pentanediamine (30 mole % to ethylenediamine) was used as a chain extender, as described in U.S. Pat. No. 4,973647.

COMPARATIVE EXAMPLE 3

The same procedure as described in EXAMPLE 1 was conducted for manufacturing a polymer except that a homogenizer was not used in the first process step and ethylenediamine was used independently as a chain extender as described in the Japanese Application Publication Patent No. 4-100919. Before dry-spinning, 0.18 wt % of diethylenetriamine was added to a polymer for the manufacture of polyurethane elastic filament and the results are shown in Table 1.

TABLE 1

| (Unit: %) | Contents of unreacted diisocyanate | ERA | Heat-setting Efficiency | ERA after heat-setting treatment |
|---|---|---|---|---|
| EX. 1 | 3.5 | 19.5 | 27.3 | 13 |
| EX. 2 | 3.5 | 24 | 28.6 | 18 |
| COMP. 1 | 13.8 | 28.9 | 26.4 | 32.1 |
| COMP. 2 | 13.9 | 30.3 | 22.1 | 30.4 |
| COMP. 3 | 14.1 | 123.7 | 12 | 25.3 |

Note:
1) ERA means elastic recovery rate.
2) EX. means EXAMPLE.
3) COMP. means COMPARATIVE EXAMPLE.

As noted in the above EXAMPLES and COMPARATIVE EXAMPLES, the polyurethane elastic filament obtained from the manufacturing process of the present invention has the advantages over COMPARATIVE EXAMPLE 1 and 2 in terms of its elastic recovery rate, and over COMPARATIVE EXAMPLE 3 in terms of heat-setting efficiency, particularly after heat-setting treatment. Table 1 shows that the polyurethane elastic filament of the present invention shows significantly improved elastic recovery rate after heat-setting treatment over COMPARATIVE EXAMPLE 1, 2 and 3, as well as having better elastic recovery rate prior to heat-setting treatment.

What is claimed is:

1. A process for producing a polymer suitable for manufacturing polyurethane-based filament comprising:

stirring a mixture of a glycol and a diisocyante, where the molar ratio of diisocyanate to glycol is about 1.5 to about 1.64, in a homogenizer and reacting said mixture to give a first polymer containing less than 4 mole % of unreacted diisocyanate;

then reacting said polymer with a chain-extender mixture containing ethylenediamine, 1,2-diaminopropane and diethylenetriamine.

2. A process according to claim 1 wherein said chain-extender mixture comprises about 74 to about 80 mole % of ethylenediamine, about 19 to about 25 mole % of 1,2-diaminopropane and about 0.2 to about 0.8 mole % of diethylenetriamine.

3. A process according to claim 1 wherein polytetramethylene ether glycol (number average molecular weight: 1700–2000) is used as the glycol.

4. A process according to claim 1 wherein p,p'-methylenediphenyldiisocyanate is used as the diisocyanate.

5. A process according to claim 1 wherein the mixture of glycol and diisocyanate is stirred in a homogenizer at about 40° to about 50° C.

6. A process of manufacturing an elastic polyurethane-based spandex filament wherein the polymer produced by the process of claim 1 is dry spun at 220° to 280° C.

7. A process according to claim 6 wherein the elastic recovery rate of said elastic filament before heat-setting treatment is in the range of 19.5 to 24% and the elastic recovery rate after heat-setting treatment is in the range 13 to 18%.

* * * * *